(12) United States Patent
Seto

(10) Patent No.: US 6,333,287 B1
(45) Date of Patent: Dec. 25, 2001

(54) COLORED GLASS

(75) Inventor: Hiromitsu Seto, Osaka (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 0 days.

(21) Appl. No.: 09/573,814

(22) Filed: May 18, 2000

(30) Foreign Application Priority Data

May 21, 1999 (JP) .................................................. 11-141360

(51) Int. Cl.$^7$ .............................. C03C 3/087; C03C 4/02
(52) U.S. Cl. ................................ 501/70; 501/64; 501/71; 501/904; 501/905
(58) Field of Search ................................. 501/64, 70, 71, 501/904, 905

(56) References Cited

U.S. PATENT DOCUMENTS 4,792,536 * 12/1988 Pecoraro et al. ....................... 501/70
5,401,287 * 3/1995 Pecoraro et al. ....................... 501/72
5,436,206 * 7/1995 Amundson, Jr. ....................... 501/71
6,103,650 * 8/2000 Krumwiede ............................ 501/71

FOREIGN PATENT DOCUMENTS

| 0 639 537 A1 | 2/1995 | (EP) . |
| 1151520 A | 4/1985 | (RU) . |
| 99/20577 | 4/1999 | (WO) . |

* cited by examiner

Primary Examiner—Karl Group
(74) Attorney, Agent, or Firm—Sughrue Mion, PLLC

(57) ABSTRACT

A colored glass is disclosed in which the generation of nickel sulfide stones has been eliminated or diminished without impairing glass appearance or productivity. The colored glass contains, in % by weight, 0.5–4% total iron oxide (T-$Fe_2O_3$) in terms of $Fe_2O_3$ and 0.0002 to less than 0.01% molybdenum in terms of Mo.

7 Claims, No Drawings

COLORED GLASS

FIELD OF THE INVENTION

The present invention relates to a colored glass containing at least 0.5% total iron oxide (T-Fe$_2$O$_3$) in terms of Fe$_2$O$_3$. More particularly, the invention relates to a colored glass which is air-quench tempered and used as a window glass for buildings or automobiles or in other applications and in which the generation of nickel sulfide (NiS) has been eliminated or diminished without impairing glass appearance or productivity.

DESCRIPTION OF THE RELATED ART

Nickel sulfide stones rarely generate in glasses. These nickel sulfide stones, which range from small ones having a particle diameter of about tens of micrometers to visually observable ones having a particle diameter of about hundreds of micrometers, are known to considerably impair the reliability (quality) of glass products.

Namely, the presence of nickel sulfide stones often poses serious problems in air-quench tempered glasses obtained by heating a glass to a temperature around the softening point thereof and then rapidly cooling the glass surfaces generally with air to form a tough compressive stress layer on each glass surface and a tensile stress layer inside and thereby improve the strength of the glass.

Nickel sulfide in a glass is known to undergo phase transition at temperatures lower than the softening point of the glass. When the glass is heated to a temperature around the softening point thereof during air-quench tempering, the nickel sulfide stones modify into a high temperature-stable phase (α phase). These nickel sulfide stones are present as the a phase in the glass even after the glass has been cooled to room temperature, and then undergo gradual phase transition to a room temperature-stable phase (β phase) with the lapse of time. Since the α-to-β phase transition of nickel sulfide stones is accompanied by a considerable volume change, high local stresses generate around the nickel sulfide stones and occasionally develop cracks. If these cracks reach the tensile stress layer present inside the air-quench tempered glass, the glass breaks in a moment.

In general, a long time is required for a tempered glass containing nickel sulfide stones to break due to the phase transition of the nickel sulfide stones. It is therefore extremely important that, from the standpoint of not impairing the reliability of products and hence of glass manufacturers, glasses containing nickel sulfide stones should not be provided as building or automotive window glasses or the like for which air tempering is conducted.

For preventing the generation of nickel sulfide stones, it is primarily necessary to prevent a nickel source from coming into the glass melting furnace. However, it is highly difficult to avoid the inclusion of a minute amount of nickel impurities. This is partly because welding rod pieces used in a construction work or stainless steel parts employed in the mechanical equipment can be causative of the inclusion of nickel impurities. There also are cases where nickel oxide is purposely added as a coloring material for glasses. In any event, it is generally difficult to completely avoid the inclusion of a nickel impurity.

Several techniques for preventing a glass containing a nickel impurity from generating nickel sulfide stones have hence been devised.

For example, U.S. Pat. No. 4,919,698 discloses a method in which the generation of nickel sulfide stones in a glass is diminished by using a furnace in which a zone close to the bottom and at least the part between the inlet and the spring zone are kept in an electrically oxidized state.

JP-A-7-144922 (the term "JP-A" as used herein means an "unexamined published Japanese patent application") discloses a method for diminishing the formation of nickel sulfide stones which comprises adding to crude batch materials at least 0.010% by weight one or more substances selected from the group consisting essentially of molybdenum, arsenic, antimony, bismuth, copper, silver, potassium dichromate, iron chromite and combinations of two or more of these.

Furthermore, JP-A-9-169537 discloses a process for producing a soda-lime glass which comprises adding a slight amount of a zinc compound to batch materials to thereby produce a melt-formed glass in which nickel sulfide is inhibited from generating from a nickel compound which was contained in the batch materials and/or from a nickel compound which came into the batch materials during the melting thereof.

The method for diminishing the generation of nickel sulfide stones disclosed in U.S. Pat. No. 4,919,698 has a drawback that the furnace is considerably limited in structure and operating conditions. In particular, this method cannot be used for the production of heat-absorbing glasses, which especially necessitates a measure against nickel sulfide, because the inside of the furnace for producing a heat-absorbing glass should be kept in a reduced state so as to sufficiently incorporate bivalent iron ions, showing heat-absorbing ability, into the glass.

The method for diminishing the formation of nickel sulfide stones disclosed in JP-A-7-144922 has a drawback, as stated in the specification, that the addition of molybdenum, copper, iron dichromate or iron chromite changes the color tone of the glass. This coloring cannot be overlooked especially in applications where an attractive appearance is important, as in automotive window glasses. In addition, arsenic and antimony cannot be used in float glass production because these elements volatilize in the float bath to foul the atmosphere in the bath, while use of bismuth or silver is unsuitable for float glass production, for which mass production is a premise, because bismuth and silver sources are highly expensive.

Furthermore, the method for diminishing the formation of nickel sulfide stones disclosed in JP-A-9-169537, which is characterized by adding a slight amount of a zinc compound to batch materials to thereby inhibit nickel sulfide generation, has a drawback that since the zinc added to the batch materials volatilizes considerably in the float bath, it not only fouls the atmosphere in the float bath but also drops off as zinc oxide from the ceiling of the float bath to impair glass quality and reduce the yield.

SUMMARY OF THE INVENTION

The present invention has been achieved in view of the problems of the conventional techniques described above.

An object of the present invention is to provide a colored glass, particularly a colored glass to be air tempered and used as a window glass for buildings or automobiles or in other applications, in which the generation of nickel sulfide (NiS) stones has been eliminated or diminished, without impairing glass appearance or productivity, by regulating the glass so as to contain 0.5 to 4% total iron oxide in terms of Fe$_2$O3 and 0.0002 to less than 0.01% molybdenum in terms of Mo.

The present invention provides a colored glass containing, in % by weight, 0.5–4% total iron oxide (T-Fe$_2$O$_3$) in terms of Fe$_2$O$_3$ and 0.0002 to less than 0.01% molybdenum in terms of Mo.

The colored glass preferably has a basic glass composition which comprises, in % by weight, 65–80% $SiO_2$,
0–5% $Al_2O_3$,
0–10% MgO,
5–15% CaO,
5–15% MgO+CaO,
10–18% $Na_2O$,
0–5% $K_2O$,
10–20% $Na_2O+K_2O$, and
0–5% $B_2O_3$.

The colored glass preferably contains, in % by weight, 0.5–2.2% total iron oxide (T-$Fe_2O_3$) in terms of $Fe_2O_3$, 0.0002 to less than 0.01% molybdenum in terms of Mo, and at least one coloring component selected from the group consisting of $TiO_2$, $CeO_2$, NiO, CoO, Se, MnO, $Cr_2O_3$, $V_2O_5$, $Nd_2O_3$ and $Er_2O_3$.

A preferred embodiment of the colored glass comprises, in % by weight, a basic glass composition comprising
    65–80% $SiO_2$,
    0–5% $Al_2O_3$,
    0–10% MgO,
    5–15% CaO,
    5–15% MgO+CaO,
    10–18% $Na_2O$,
    0–5% $K_2O$,
    10–20% $Na_2O+K_2O$, and
    0–5% $B_2O_3$;
a coloring component comprising
    0.5–2.2% total iron oxide (T-$Fe_2O_3$) in terms of $Fe_2O_3$,
    0.01–1.0% $TiO_2$, and
    0.1–2.0% $CeO_2$; and
0.0002 to less than 0.01% molybdenum in terms of Mo for inhibiting the generation of nickel sulfide stones.

Another preferred embodiment of the colored glass comprises, in % by weight, a basic glass composition comprising
    65–80% $SiO_2$,
    0–5% $Al_2O_3$,
    0–10% MgO,
    5–15% CaO,
    5–15% MgO+CaO,
    10–18% $Na_2O$,
    0–5% $K_2O$,
    10–20% $Na_2O+K_2O$, and
    0–5% $B_2O_3$;
a coloring component comprising
    0.5–2.2% total iron oxide (T-$Fe_2O_3$) in terms of $Fe_2O_3$,
    0–0.2% NiO, and
    0.003–0.04% CoO; and
0.0002 to less than 0.01% molybdenum in terms of Mo for inhibiting the generation of nickel sulfide stones.

Still another preferred embodiment of the colored glass comprises, in % by weight, a basic glass composition comprising
    65–80% $SiO_2$,
    0–5% $Al_2O_3$,
    0–10% MgO,
    5–15% CaO,
    5–15% MgO+CaO,
    10–18% $Na_2O$,
    0–5% $K_2O$,
    10–20% $Na_2O+K_2O$, and
    0–5% $B_2O_3$;
a coloring component comprising
    0.5–2.2% total iron oxide (T-$Fe_2O_3$) in terms of $Fe_2O_3$,
    0–0.2% NiO,
    0.003–0.04% CoO, and
    0.0001–0.004% Se; and
0.0002 to less than 0.01% molybdenum in terms of Mo for inhibiting the generation of nickel sulfide stones.

DETAILED DESCRIPTION OF THE INVENTION

Embodiments of the present invention will be explained in detail below.

The reasons for limitations of the composition of the colored glass of the present invention, in which the generation of nickel sulfide stones is inhibited, will be explained below. Hereinafter, all percents used for indicating component amounts are by weight.

Iron oxide in the glass is present in the forms of $Fe_2O_3$ and FeO. With respect to optical properties of the glass, $Fe_2O_3$ is an ingredient which enhances the ability to absorb ultraviolet rays, while FeO is an ingredient which enhances the ability to absorb infrared rays. Iron oxide serves also to inhibit the generation of nickel sulfide in cooperation with molybdenum.

In case where the amount of total iron oxide (T-$Fe_2O_3$) in terms of $Fe_2O_3$ is smaller than 0.5%, the effect of absorbing ultraviolet and infrared rays is too low and desired optical properties cannot be obtained. On the other hand, too large amounts of T-$Fe_2O_3$ are undesirable in that the molten glass emits considerable radiant heat due to the infrared ray absorbing effect of ferrous oxide, leading to the possibility that the ceiling of the melting furnace may be heated to or above the heat-resistant temperature thereof. From the standpoint that the colored glass of the present invention and a glass having a different composition are successively produced with the same glass melting furnace, too large amounts of T-$Fe_2O_3$ are undesirable in that the compositional change requires much time. Consequently, the amount of T-$Fe_2O_3$ is preferably 4% or smaller, more preferably 2.2% or smaller.

Molybdenum, which is essential to the present invention, is an ingredient which inhibits the generation of nickel sulfide stones. By adding a slight amount of molybdenum to a colored glass together with iron oxide, the generation of nickel sulfide can be inhibited without influencing the color tone of the glass.

It has been found that the effect of inhibiting the generation of nickel sulfide stones in a glass composition containing both iron and molybdenum, as in the glass of the present invention, is higher than that expected in the case where either of the two ingredients is present. Although the reasons for this have not been elucidated, it is thought that the inhibitory effect is attributable to some interaction between the iron and the molybdenum.

Molybdenum amounts smaller than 0.0002% in terms of Mo do not result in a sufficient effect, while addition of molybdenum in an amount of 0.01% or larger influences the color tone of the glass. Such too large molybdenum amounts are undesirable in that the glass colored with molybdenum has a yellowish brown color, which is a color tone with an exceedingly poor appearance as if the glass has been stained with nicotine. Too large addition amounts of molybdenum are undesirable also because the glass production cost is increased thereby.

$TiO_2$, $CeO_2$ and $V_2O_5$ are coloring ingredients which impart ultraviolet absorbing ability to the glass. NiO, CoO, Se, MnO, $Cr_2O_3$, $Nd_2O_3$ and $Er_2O_3$, when added alone or in combination of two or more thereof, are effective in regulating mainly the visible light transmittance and thus imparting a desired color tone to the glass. Combinations suitable for obtaining specific color tones are shown below.

For example, in the case of a glass having such a green tone that the visible light transmittance as measured with the CIE standard illuminant A ($Y_A$) is as high as 70% or higher, the glass preferably contains 0.5–2.2% $T$-$Fe_2O_3$ in combination with 0.01–1.0% $TiO_2$ and 0.1–2.0% $CeO_2$.

In the case of obtaining a grayish green tone, the glass preferably contains 0.5–2.2% $T$-$Fe_2O_3$ in combination with 0–0.2% NiO and 0.003–0.04% CoO.

In the case of obtaining a gray tone having a low excitation purity, the glass preferably contains 0.5–2.2% $T$-$Fe_2O_3$ in combination with 0–0.2% NiO, 0.003–0.04% CoO and 0.0001–0.004% Se.

Although the colored glass of the present invention is preferably produced by the float process, methods for producing the glass should not be construed as being limited thereto. The reasons for limitations of the preferred basic glass composition will be explained below. Hereinafter, all percents used for indicating component amounts are by weight.

$SiO_2$ (silica) is the main component forming a glass skeleton. Content of $SiO_2$ lower than 65% results in reduced durability of the glass, while content thereof exceeding 80% results in difficulties in melting the glass.

$Al_2O_3$ is an ingredient which improves the durability of the glass. Content thereof exceeding 5% results in difficulties in melting the glass. The preferred range of the content of $Al_2O_3$ is from 0.1 to 2%.

MgO and CaO are used for improving the durability of the glass and regulating the liquidus temperature and viscosity of the glass during forming. Content of MgO exceeding 10% results in an elevated liquidus temperature. Content of CaO lower than 5% or exceeding 15% results in an elevated liquidus temperature. In case where the total content of MgO and CaO is lower than 5%, the glass has reduced durability. In case where the total content thereof exceeds 15%, the glass has an elevated devitrification temperature.

$Na_2O$ and $K_2O$ accelerate glass melting. In case where the content of $Na_2O$ is lower than 10% or the total content of $Na_2O$ and $K_2O$ is lower than 10%, the effect of melting acceleration is poor. In case where the content of $Na_2O$ exceeds 18% or the total content of $Na_2O$ and $K_2O$ exceeds 20%, the glass has reduced durability. The content of $K_2O$ is desirably 5% or lower because too large $K_2O$ amounts result in an increased cost.

$B_2O_3$ is an ingredient used not only for improving the durability of the glass but as a melting aid. It further serves to enhance the absorption of ultraviolet rays. Content of $B_2O_3$ exceeding 5% arises problems in glass forming due to volatilization of $B_2O_3$ etc. Consequently, the upper limit of $B_2O_3$ content is 5%.

$SnO_2$ may be added as a clarificant or reducing agent to a glass having a composition within the range according to the present invention, in an amount of from 0 to 1% as long as the desired color tone of the glass is not impaired thereby; color tone retention is an object of the present invention.

EXAMPLES

Embodiments of the invention will be described below by reference to the following Examples, but the invention should not be construed as being limited thereto.

Examples 1 to 7 and Comparative Examples 1 to 4

To typical soda-lime silicate glass batch materials were added necessary amounts of molybdenum trioxide, ferric oxide, titanium oxide, cerium oxide, cobalt oxide, selenium metal, nickel oxide, chromium oxide, neodymium oxide and erbium oxide. Thereto were added a carbonaceous reducing agent (e.g., breeze) a clarificant and a nickel metal powder for accelerating the generation of nickel sulfide stones. The nickel powder was added in an amount corresponding to 0.035%. These materials were mixed together. This batch was placed in an alumina crucible having a capacity of 250 cc and heated to 1,400° C. in an electric furnace. After the batch was kept molten for 2 hours and 20 minutes at that temperature, the resulting molten glass was poured onto a stainless steel plate and annealed to obtain a glass plate. The glass plate obtained was examined with a microscope to determine the number and sizes of nickel sulfide stones present in the glass.

Table 1 shows the basic glass composition of the samples thus obtained. Tables 2 and 3 show the $T$-$Fe_2O_3$ concentration, FeO (in terms of $Fe_2O_3$)/$T$-$Fe_2O_3$ ratio (%by weight), $TiO_2$ concentration, $CeO_2$ concentration, CoO concentration, NiO concentration, Se concentration and Mo concentration in each sample, the number and maximum diameter ($\mu$m) of nickel sulfide (NiS) stones for each sample, and the number of NiS stones per g of each sample. In Tables 1 to 3, the numerals indicating the concentrations are given in % by weight, except that the unit of CoO, NiO, Se and Mo concentrations is ppm. In Table 1, the value of $SiO_2$ concentration has no figures in decimal places; this is because that concentration value was obtained by rounding to the nearest whole number.

TABLE 1

| Basic glass composition (wt %) | |
|---|---|
| $SiO_2$ | 71 |
| $Al_2O_3$ | 1.6 |
| MgO | 3.6 |
| CaO | 7.7 |
| $Na_2O$ | 13.7 |
| $K_2O$ | 0.9 |

TABLE 2

| | Example | | | |
|---|---|---|---|---|
| | 1 | 2 | 3 | 4 |
| T—$Fe_2O_3$ (wt %) | 1.00 | 0.65 | 1.25 | 1.24 |
| FeO/T—$Fe_2O_3$ (%) | 23 | 26 | 23 | 24 |
| $TiO_2$ (wt %) | 0.03 | 0.15 | 0.03 | 0.03 |
| $CeO_2$ (wt %) | 1.00 | 1.65 | 0 | 0 |
| CoO (ppm) | 0 | 2 | 180 | 190 |
| NiO (ppm) | 0 | 0 | 690 | 660 |
| Se (ppm) | 0 | 0 | 0 | 14 |
| Mo (ppm) | 7 | 11 | 20 | 60 |
| Number of NiS stones | 26 | 32 | 12 | 3 |
| Maximum diameter ($\mu$m) | 250 | 300 | 200 | 260 |
| Number of NiS stones (per g) | 0.17 | 0.20 | 0.097 | 0.019 |

TABLE 2-continued

| | Example | | |
|---|---|---|---|
| | 5 | 6 | 7 |
| T—$Fe_2O_3$ (wt %) | 2.00 | 1.30 | 3.1 |
| FeO/T—$Fe_2O_3$ (%) | 24 | 23 | 24 |
| $TiO_2$ (wt %) | 0.05 | 0.03 | 0.03 |
| $CeO_2$ (wt %) | 0 | 0 | 0 |
| $Nd_2O_3$ (wt %) | 1.0 | 0 | 0 |
| CoO (ppm) | 0 | 180 | 0 |
| NiO (ppm) | 0 | 1000 | 0 |
| Se (ppm) | 0 | 0 | 0 |
| Mo (ppm) | 3 | 20 | 70 |
| Number of NiS stones | 19 | 16 | 0 (no NiS was observed) |
| Maximum diameter (μm) | 240 | 320 | 0 |
| Number of NiS stones (per g) | 0.13 | 0.089 | 0 |

TABLE 3

| | Comparative Example | | | |
|---|---|---|---|---|
| | 1 | 2 | 3 | 4 |
| T—$Fe_2O_3$ (wt %) | 0.12 | 0.65 | 0.12 | 0.12 |
| FeO/T—$Fe_2O_3$ (%) | 2.2 | 26 | 22 | 26 |
| $TiO_2$ (wt %) | 0.03 | 0.13 | 0.03 | 0.13 |
| $CeO_2$ (wt %) | 0 | 1.65 | 0 | 0 |
| CoO (ppm) | 0 | 0 | 0 | 0 |
| NiO (ppm) | 0 | 0 | 0 | 0 |
| Se (ppm) | 0 | 0 | 0 | 0 |
| Mo (ppm) | 0 | 0 | 75 | 11 |
| Number of NiS stones | 65 | 45 | 58 | 63 |
| Maximum diameter (μm) | 180 | 240 | 200 | 200 |
| Number of NiS stones (per g) | 0.49 | 0.29 | 0.26 | 0.41 |

The samples obtained in Examples 1 to 7 each has a composition within the scope of the present invention. As is apparent from Table 1, these samples of Examples 1 to 7 each has a basic glass composition within the preferred range according to the present invention. The sample obtained in Comparative Example 1 has a typical soda-lime silicate glass composition. A comparison in the number of NiS stones between Comparative Example 1 and Examples 1 to 7 shows that the present invention is effective in eliminating or diminishing the generation of nickel sulfide.

The samples obtained in Examples 1 to 6 each has a composition within a preferred range according to the present invention. Table 2 shows that these samples are colored glasses in which the generation of nickel sulfide has been eliminated or diminished. Of these samples, those obtained in Examples 1 to 4 and 6 each has an excellent appearance and is suitable for use as a window glass for buildings and automobiles. Features of these are described below.

The samples obtained in Examples 1 and 2 each has a composition within another preferred range according to the present invention. These samples of Examples 1 and 2 have a visible light transmittance of 70% or higher as measured with the CIE standard illuminant A and are colored glasses having a green tone. As is apparent from Table 2, they are colored glasses in which the generation of nickel sulfide has been eliminated or diminished. A comparison between Example 2 and Comparative Examples 2 and 3 shows that the coexistence of iron and molybdenum produces an excellent effect in diminishing nickel sulfide.

The samples obtained in Examples 3 and 6 each has a composition within still another preferred range according to the present invention. These samples of Examples 3 and 6 are colored glasses having a grayish green tone. As is apparent from Table 2, they are colored glasses in which the generation of nickel sulfide has been eliminated or diminished.

The sample obtained in Example 4 has a composition within a further preferred range according to the present invention. This sample of Example 4 is a colored glass having a gray tone with a low excitation purity. As is apparent from Table 2, it is a colored glass in which the generation of nickel sulfide has been eliminated or diminished.

The sample obtained in Comparative Example 1 has a typical soda-lime silicate glass composition, which is outside the scope of the present invention with respect to each of T-$Fe_2O_3$ and molybdenum amount. The number of NiS stones generated in this composition clearly shows the NiS generation inhibitory effect in the present invention. The sample obtained in Comparative Example 2 has a composition in which T-$Fe_2O_3$ only is within the scope of the present invention, while the samples obtained in Comparative Examples 3 and 4 have a composition in which molybdenum amount only is within the scope of the present invention. The results show that all these samples are inferior in NiS generation inhibitory effect to the samples according to the present invention.

As described above in detail, a colored glass in which the generation of nickel sulfide stones has been eliminated or diminished without impairing glass appearance or productivity can be provided according to the present invention.

What is claimed is:

1. A colored glass containing, in % by weight, 0.5–4% total iron oxide (T-$Fe_2O_3$) in terms of $Fe_2O_3$ and 0.0002 to less than 0.01% molybdenum in terms of Mo.

2. The colored glass as claimed in claim 1, wherein a basic glass composition in the colored glass comprises, in % by weight, 65–80% $SiO_2$,
0–5% $Al_2O_3$,
0–10% MgO,
5–15% CaO,
5–15% MgO+CaO,
10–18% $Na_2O$,
0–5% $K_2O$,
10–20% $Na_2O+K_2O$, and
0–5% $B_2O_3$.

3. The colored glass as claimed in claim 1, which contains, in % by weight, 0.5–2.2% total iron oxide (T-$Fe_2O_3$) in terms of $Fe_2O_3$, 0.0002 to less than 0.01% molybdenum in terms of Mo, and at least one coloring component selected from the group consisting of $TiO_2$, $CeO_2$, NiO, CoO, Se, MnO, $Cr_2O_3$, $V_2O_5$, $Nd_2O_3$ and $Er_2O_3$.

4. The colored glass as claimed in claim 2, which contains, in % by weight, 0.5–2.2% total iron oxide (T-$Fe_2O_3$) in terms of $Fe_2O_3$, 0.0002 to less than 0.01% molybdenum in terms of Mo, and at least one coloring component selected from the group consisting of $TiO_2$, $CeO_2$, NiO, CoO, Se, MnO, $Cr_2O_3$, $V_2O_3$, $Nd_2O_3$ and $Er_2O_3$.

5. The colored glass as claimed in claim 1, which comprises, in % by weight,
   a basic glass composition comprising
   65–80% $SiO_2$,
   0–5% $Al_2O_3$,
   0–10% MgO,
   5–15% CaO,
   5–15% MgO+CaO,
   10–18% $Na_2O$,
   0–5% $K_2O$,
   10–20% $Na_2O+K_2O$, and
   0–5% $B_2O_3$;
   a coloring component comprising
   0.5–2.2% total iron oxide (T-$Fe_2O_3$) in terms of $Fe_2O_3$,
   0.01–1.0% $TiO_2$, and
   0.1–2.0% $CeO_2$; and
   0.0002 to less than 0.01% molybdenum in terms of Mo.

6. The colored glass as claimed in claim 1, which comprises, in % by weight,
   a basic glass composition comprising
   65–80% $SiO_2$,
   0–5% $Al_2O_3$,
   0–10% MgO,
   5–15% CaO,
   5–15% MgO+CaO,
   10–18% $Na_2O$,
   0–5% $K_2O$,
   10–20% $Na_2O+K_2O$, and
   0–5% $B_2O_3$;
   a coloring component comprising
   0.5–2.2% total iron oxide (T-$Fe_2O_3$) in terms of $Fe_2O_3$,
   0–0.2% NiO, and
   0.003–0.04% CoO; and
   0.0002 to less than 0.01% molybdenum in terms of Mo.

7. The colored glass as claimed in claim 1, which comprises, in % by weight,
   a basic glass composition comprising
   65–80% $SiO_2$,
   0–5% $Al_2O_3$,
   0–10% MgO,
   5–15% CaO,
   5–15% MgO+CaO,
   10–18% $Na_2O$,
   0–5% $K_2O$,
   10–20% $Na_2O+K_2O$, and
   0–5% $B_2O_3$;
   a coloring component comprising
   0.5–2.2% total iron oxide (T-$Fe_2O_3$) in terms of $Fe_2O_3$,
   0–0.2% NiO,
   0.003–0.04% CoO, and
   0.0001–0.004% Se; and
   0.0002 to less than 0.01% molybdenum in terms of Mo.

\* \* \* \* \*